United States Patent
Song (10) Patent No.: US 9,044,882 B2
(45) Date of Patent: Jun. 2, 2015

(54) ARTICLE OF FOOTWEAR WITH SUPPORT COLUMNS HAVING PORTIONS WITH DIFFERENT RESILIENCIES AND METHOD OF MAKING SAME

(75) Inventor: Kyoungmin Song, Busan (KR)

(73) Assignee: NIKE, Inc., Beaverton, OR (US)

( * ) Notice: Subject to any disclaimer, the term of this patent is extended or adjusted under 35 U.S.C. 154(b) by 935 days.

(21) Appl. No.: 13/118,982

(22) Filed: May 31, 2011

(65) Prior Publication Data
US 2012/0304501 A1 Dec. 6, 2012

(51) Int. Cl.
| | |
|---|---|
| B29C 44/04 | (2006.01) |
| B29C 43/14 | (2006.01) |
| B29C 43/18 | (2006.01) |
| B29C 43/30 | (2006.01) |
| A43B 13/12 | (2006.01) |
| A43B 13/18 | (2006.01) |
| B29D 35/12 | (2010.01) |
| B29D 35/14 | (2010.01) |
| B29K 21/00 | (2006.01) |
| B29K 75/00 | (2006.01) |

(52) U.S. Cl.
CPC ........... *B29C 43/146* (2013.01); *B29K 2021/00* (2013.01); *B29C 43/18* (2013.01); *B29K 2075/00* (2013.01); *B29C 43/305* (2013.01); *A43B 13/125* (2013.01); *A43B 13/188* (2013.01); *B29D 35/122* (2013.01); *B29D 35/142* (2013.01)

(58) Field of Classification Search
CPC ........ A43D 29/00; B29C 43/14; B29C 43/20; B29C 43/146
USPC .......................................... 264/241, 259, 266
See application file for complete search history.

(56) References Cited

U.S. PATENT DOCUMENTS

| | | | |
|---|---|---|---|
| 4,888,887 A | 12/1989 | Solow | |
| 5,147,589 A * | 9/1992 | Chang et al. | 264/45.1 |
| 5,343,639 A | 9/1994 | Kilgore et al. | |
| 5,353,523 A | 10/1994 | Kilgore et al. | |
| 6,647,645 B2 | 11/2003 | Kita | |
| 6,722,058 B2 | 4/2004 | Lucas et al. | |
| 6,775,930 B2 | 8/2004 | Fuerst | |
| 7,448,149 B2 | 11/2008 | Preskar et al. | |
| 2004/0221483 A1* | 11/2004 | Cartier et al. | 36/27 |
| 2005/0276954 A1* | 12/2005 | Bramani | 428/195.1 |
| 2007/0028484 A1 | 2/2007 | Akhidime | |
| 2007/0193065 A1 | 8/2007 | Nishiwaki et al. | |
| 2008/0034615 A1 | 2/2008 | Nishiwaki et al. | |
| 2009/0113758 A1 | 5/2009 | Nishiwaki et al. | |
| 2011/0039968 A1* | 2/2011 | Vairo | 521/170 |

FOREIGN PATENT DOCUMENTS

FR 2634631 A1 2/1990

* cited by examiner

*Primary Examiner* — Galen Hauth
(74) *Attorney, Agent, or Firm* — Banner & Witcoff, Ltd.

(57) ABSTRACT

An article of footwear includes an upper; a midsole positioned beneath the upper and including a plurality of support members, at least one support member being formed of a lower portion formed of a first material, and an upper portion positioned above the lower portion and formed of a second material, the second material having a higher resiliency than that of the first material.

15 Claims, 4 Drawing Sheets

ARTICLE OF FOOTWEAR WITH SUPPORT COLUMNS HAVING PORTIONS WITH DIFFERENT RESILIENCIES AND METHOD OF MAKING SAME

FIELD

Aspects of this invention relate generally to footwear, and, in particular, to an article of footwear having a support assembly with support members having portions having different resiliencies than other portions, and to methods of manufacturing such footwear.

BACKGROUND

Conventional articles of athletic footwear generally include two primary elements, an upper and a sole structure. The upper is secured to the sole structure and forms a void on the interior of the footwear for comfortably and securely receiving a foot. The sole structure is secured to a lower portion of the upper and is positioned between the foot and the ground. The sole structure generally incorporates multiple layers that are conventionally referred to as an insole, a midsole, and an outsole. The insole, or sockliner, is a thin, compressible member located within the void and proximate a lower surface of the foot to enhance footwear comfort. The midsole, which is conventionally secured to the upper along the length of the upper, forms a middle layer of the sole structure and is primarily responsible for attenuating ground (or other contact surface) reaction forces to lessen stresses upon the foot and leg. The outsole forms a ground-engaging portion (or other contact surface-engaging portion) of the sole structure, and is formed from a durable and wear-resistant material that includes texturing to improve traction.

The conventional midsole is primarily formed from a resilient, polymer foam material that extends throughout the length of the footwear, often by way of an injection molding process. The properties of the polymer foam material in the midsole are primarily dependent upon factors that include the dimensional configuration of the midsole and the specific characteristics of the material selected for the polymer foam, including the hardness or density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

It would be desirable to provide a sole assembly that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to provide an article of footwear footwear having a support assembly with certain portions of support members having different resiliencies than other portions, and to methods of manufacturing such footwear.

In accordance with a first aspect, a method of manufacturing a support assembly for an article of footwear includes the steps of placing a first material into a first recess in a first portion of a mold; placing an insert in a second recess in a second portion of the mold; heating the mold a first time for a first predetermined period of time at a first predetermined temperature; removing the insert from the mold and placing a second material in the second recess, the second material having a higher resiliency than the first material; heating the mold a second time for a second predetermined period of time at a second predetermined temperature such that the first and second materials bond together to form a support member of a support assembly; and removing the support member from the mold.

In accordance with another aspect, a method of manufacturing a support assembly for an article of footwear includes the steps of pouring a quantity of polyurethane having a first resiliency into a plurality of first recesses and a web recess interconnecting the first recesses in a first portion of a mold; placing each of a plurality of inserts in a corresponding second recess in a second portion of the mold; heating the mold a first time for a first predetermined period of time at a first predetermined temperature; removing the inserts from the second recesses and pouring a quantity of polyurethane having a second resiliency that is less than the first resiliency into the second recesses; heating the mold a second time for a second predetermined period of time at a second predetermined temperature such that the first and second materials bond together to form a support assembly including a plurality of support members interconnected by a web; and removing the support assembly from the mold.

In accordance with a further aspect, an article of footwear includes an upper; a midsole positioned beneath the upper and having a plurality of support members, wherein at least one support member is formed of a lower portion formed of a first material, and an upper portion positioned above the lower portion and formed of a second material, the second material having a higher resiliency than that of the first material; and an outsole positioned beneath the midsole.

By providing an article of footwear with a support assembly with certain portions of support members having different resiliencies than other portions according to certain embodiments, a user can be provided with improved stability as well as improved cushioning and support. This is highly advantageous since this can improve the feel and performance of the user's footwear.

These and additional features and advantages disclosed here will be further understood from the following detailed disclosure of certain embodiments.

The figures referred to above are not drawn necessarily to scale, should be understood to provide a representation of particular embodiments of the invention, and are merely conceptual in nature and illustrative of the principles involved. Some features of the footwear with a support assembly with certain portions of support members having different resiliencies than other portions depicted in the drawings have been enlarged or distorted relative to others to facilitate explanation and understanding. The same reference numbers are used in the drawings for similar or identical components and features shown in various alternative embodiments. Footwear with a sole assembly as disclosed herein would have configurations and components determined, in part, by the intended application and environment in which they are used.

DETAILED DESCRIPTION OF CERTAIN PREFERRED EMBODIMENTS

Figure 1:
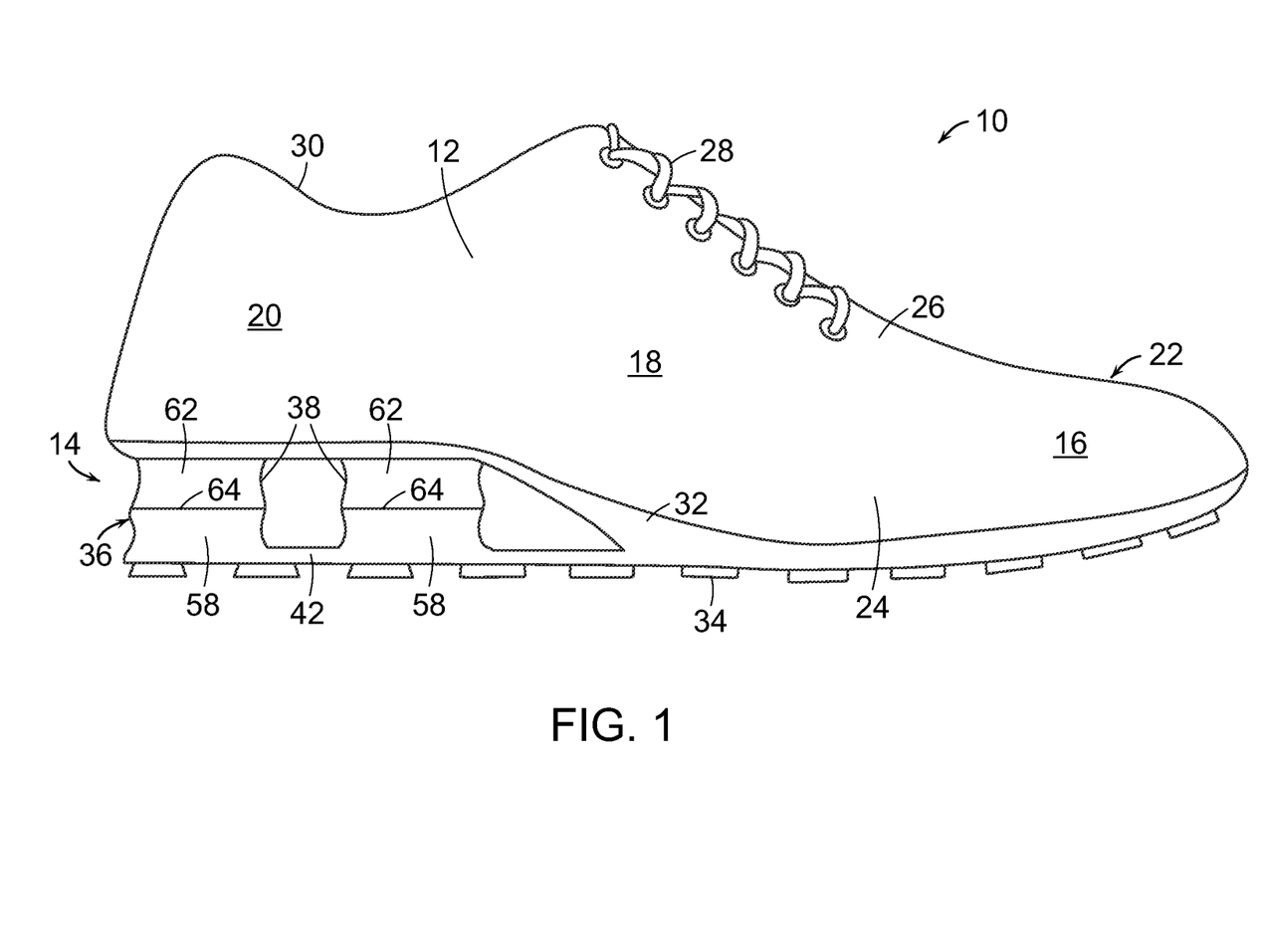
FIG. 1 is a perspective view of an article of footwear having a support assembly with support members having portions with different properties.

An article of footwear 10 is depicted in FIG. 1 as including an upper 12 and a sole assembly 14. Article of footwear 10 can be any of various articles of casual footwear having configurations suitable, for example, for walking or lounging. Footwear 10 may also be one of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to footwear 10 may be applied to a wide variety of footwear styles, in addition to the specific styles discussed herein and depicted in the accompanying figures.

For purposes of reference in the following description, footwear 10 may be divided into three general regions: a forefoot region 16, a midfoot region 18, and a heel region 20. Regions 16-20 are not intended to demarcate precise areas of footwear 10. Rather, regions 16-20 are intended to represent general areas of footwear 10 that provide a frame of reference during the following discussion. Although regions 16-20 apply generally to footwear 10, references to regions 16-20 also may apply specifically to upper 12, sole assembly 14, or individual components within either upper 12 or sole assembly 14.

Upper 12 defines a void or chamber for receiving a foot. For purposes of reference, upper 12 includes a medial side 22, an opposite lateral side 24, and a vamp or instep area 26. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20. Upper 12 may also include a closure mechanism, such as lace 28. Upper 12 also includes an ankle opening 30 that provides the foot with access to the void within upper 12.

Sole assembly 14 includes a midsole 32 positioned below upper 12. Midsole 32 serves to provide shock-attenuation and energy-absorption for footwear 10. In certain embodiments, midsole 32 is secured to upper 12. Midsole 32 may be secured to upper 12 with an adhesive, for example. Suitable adhesives are well known in the art and need not be discussed in greater detail here. Midsole 32 may be secured to upper 12 with any other suitable fastening means including, for example, stitching, or stitching and adhesive. Other suitable means of fastening midsole 32 to upper 12 will become readily apparent to those skilled in the art, given the benefit of this disclosure. Suitable materials for midsole 32 include any of the conventional polymer foams that are utilized in footwear midsoles, including ethylvinylacetate and polyurethane foam. Other suitable materials for midsole 32 will become readily apparent to those skilled in the art, given the benefit of this disclosure.

An outsole 34 is positioned below midsole 32. In certain embodiments, outsole 34 is secured to midsole 32. In other embodiments, outsole 34 may also, or alternatively, be secured to upper 12. Outsole 34 may be secured to midsole 32 and/or upper 12 with an adhesive, for example. Suitable adhesives are well known in the art and need not be discussed in greater detail here. Outsole 34 may be secured to midsole 32 and/or upper 12 with any other suitable fastening means including, for example, stitching, or stitching and adhesive. Other suitable means of fastening outsole 34 to midsole 32 and/or upper 12 will become readily apparent to those skilled in the art, given the benefit of this disclosure.

In certain embodiments, outsole 34 may be formed of a layer of material secured to and extending over the bottom surface of midsole 32. In other embodiments, outsole 34 may be formed of a plurality of individual elements secured to the bottom surface of midsole 32. Suitable materials for outsole 34 include any of the conventional rubber materials that are utilized in footwear outsoles, such as carbon black rubber compound. Other suitable materials for outsole 28 will become readily apparent to those skilled in the art, given the benefit of this disclosure.

Sole assembly 14 includes a support assembly 36. Support assembly 36 serves to provide shock-attenuation and energy-absorption for footwear 10, and includes a plurality of elastomeric support members 38. Support members 38 may be columnar members or column-like members. Support members may have a height greater a width thereof, a height substantially equal to a width thereof, or a height less than a width thereof. In certain embodiments, as illustrated herein, support members 38 may have a generally cylindrical configuration. However, it is to be appreciated that support members 38 may have a variety of other cross-sectional configurations including oval, pyramidal, cubic, conic, or any other regular geometric shape. In addition to regular shapes, support members 38 may have a cross-section with an irregular geometric shape. Accordingly, support members 38 may have a variety of configurations that perform the functions described herein.

Support members 38 extend substantially vertically between a bottom surface of midsole 32 and outsole 34. It is to be appreciated that support members 38 are complete and distinct elements, substantially free of gaps about or along their circumference. However, it is to be appreciated that support members 38 may have minor imperfections, recesses, projections and/or gaps on their surface due to material imperfections and manufacturing constraints.

Figure 7:
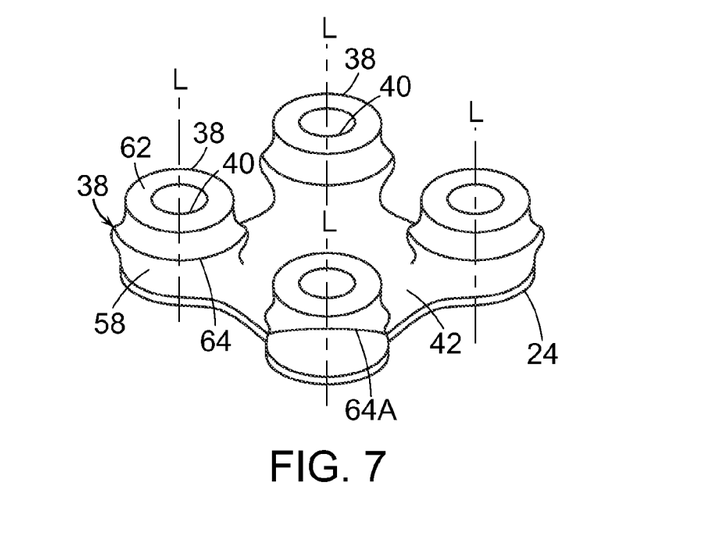
FIG. 7 is a perspective view of the support assembly of the article of footwear of FIG. 1.
Figure 8:
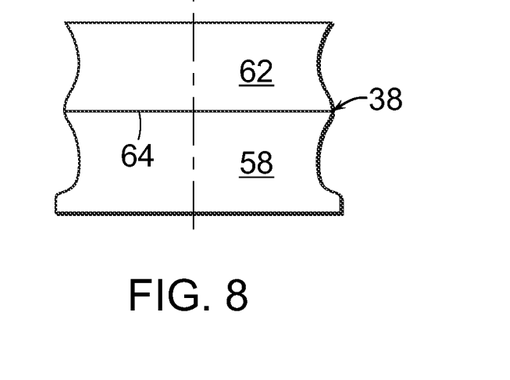
FIG. 8 is an elevation view of a column of the support assembly of the article of footwear of FIG. 1.

One or more support members 38 may include an interior void 40, as illustrated in FIG. 7. As seen there, void 40 may be a cylindrical aperture extending vertically through support member 38, along a longitudinal axis L of support member 38. Each support member 38 may also include a plurality of physical features, including a smooth surface, circumscribing ridges, one or more circumscribing indentations, one or more circumscribing indentations that include one or more ribs, rings, or indicia, as disclosed in commonly owned U.S. Pat. Nos. 5,353,523 and 5,343,639 to Kilgore et al., the entire disclosures of which are incorporated herein by reference.

In the illustrated embodiment, a web 42 extends between support members 38. Web 42 is a substantially planar member providing connectivity and support between and amongst support members 38. In the illustrated embodiment, web 42 is connected to support members 38 at a bottom or lowermost edge of support members 38. Web 42 also aids in manufacturing footwear 10, increasing productivity and ease of assembly.

In the illustrated embodiment, support assembly 36 includes four support members 38 positioned in heel portion 20 of footwear 10 as seen in FIG. 7, with only two support members 38 being visible in FIG. 1. It is to be appreciated that support assembly 36 can include fewer or more than four support members 38. Additionally, support members 38 need not necessarily be positioned solely in heel portion 20. Thus, support assembly 36 may be located in any one of regions 16-20 or in any combination of regions 16-20, and, therefore, could extend along the complete length of footwear 10 or along only a portion of footwear 10. Suitable numbers and locations of support members 38 of support assembly 36 will become readily apparent to those skilled in the art, given the benefit of this disclosure.

An embodiment of a method of making support assembly 36 is illustrated in FIGS. 2-6. A mold assembly 44 used for molding support assembly 36 includes a first portion 46 having at least one recess 48 formed therein. In the illustrated embodiment there are plurality of first recesses 48 formed therein. In certain embodiments, first portion 46 includes four first recesses 48, with a web recess 49 formed in first portion 46 that interconnects the plurality of first recesses 48. A second portion 50 has a plurality of second recesses 52 formed therein.

Figure 2:
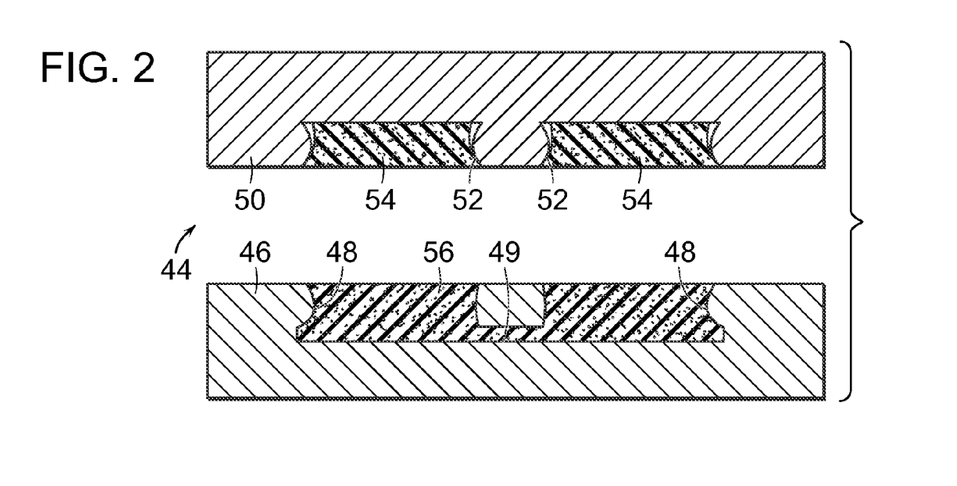
FIG. 2 is a section view of a mold used to make the support assembly of the article of footwear of FIG. 1, shown in an open condition with a first material poured into a first portion of the mold and inserts seated in a second portion of the mold.

Inserts 54 are positioned in each of second recesses 52, as seen in FIG. 2. In certain embodiments, inserts 54 are formed of silicon. Other suitable materials for inserts 54 will become readily apparent to those skilled in the art, given the benefit of this disclosure.

A first material 56 is then put into first recess 48. In certain embodiments, first material 56 may be poured into first recess 48. It is to be appreciated that first material 56 can be inserted into first recess 48 in other manners, such as injection. In certain embodiments, first material 56 is polyurethane (PU) foam.

A release agent may be applied to the exposed surface of inserts 54 order to facilitate the separation of inserts 54 from first material 56 in a later stage of formation of support assembly 36. It is to be appreciated that the release agent may also be applied directly to the surfaces of first recess 48 and second recesses 42 to facilitate removal of support assembly 36 from mold assembly 44. The release agent may be a spray release agent or any other suitable release agent. Suitable materials for the release agent include, for example, siloxane and water. Other suitable release agents will become readily apparent to those skilled in the art, given the benefit of this disclosure.

Figure 3:
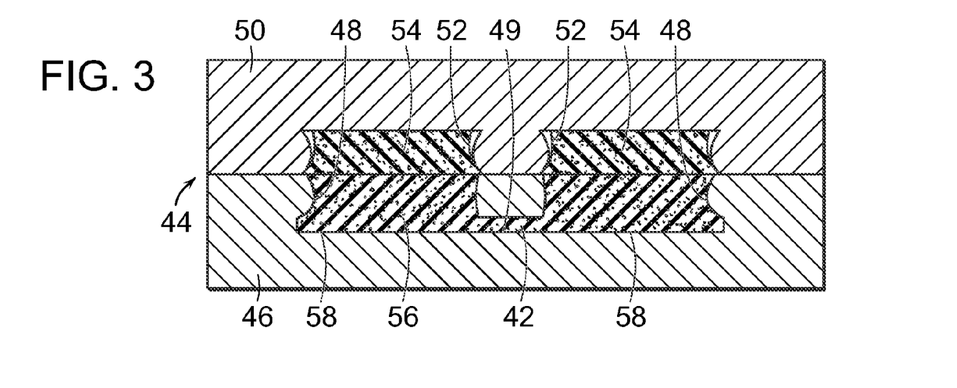
FIG. 3 is a section view of the mold of FIG. 2, shown in a closed condition.

Mold assembly 44 is then closed, as seen in FIG. 3, so that first portion 46 of mold assembly 44 is in contact with second portion 50 of mold assembly 44, and inserts 54 are in contact with first material 56, with first and second recesses 48, 52 cooperating to define a recess used to form a support member 38. First portion 46 and second portion 50 may be hinged together, or they may be separate elements that are suitably aligned and placed in contact with one another.

Mold assembly 44 with first material 56 and inserts 54 contained therein is then heated for a specified period of time. In certain embodiments, mold assembly 44 at this point is heated at a temperature of between about 60° C. and about 70° C. for between about 5 and about 8 minutes. After this initial heating step is complete, mold assembly 44 is opened, and inserts 54 are removed from recesses 52, as illustrated in FIG. 4, leaving behind first portions 58 of support members 38 and web 42.

Figure 4:
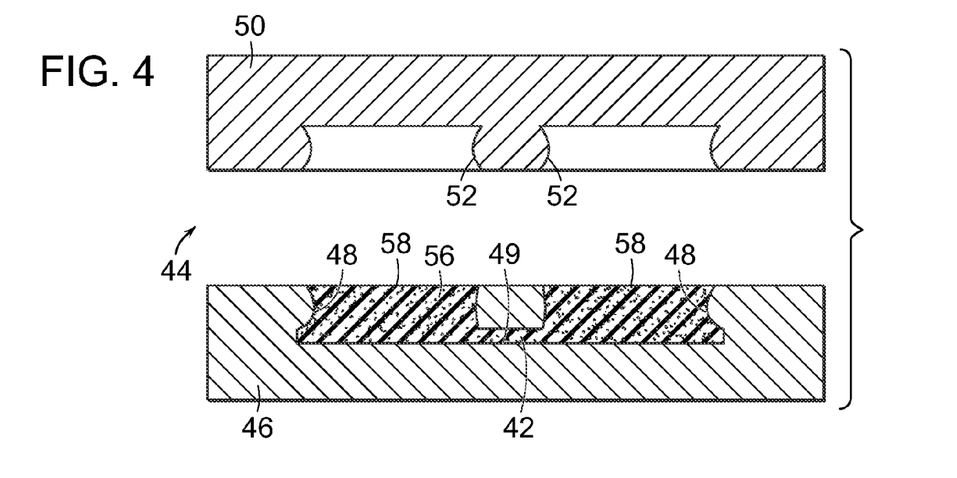
FIG. 4 is a section view of the mold of FIG. 2 shown in an open condition with the inserts removed.
Figure 5:
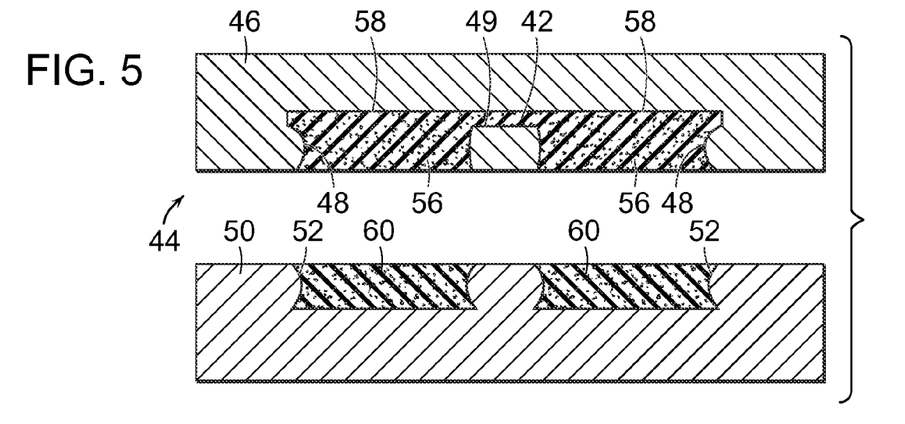
FIG. 5 is a section view of the mold of FIG. 2 shown in an inverted and open condition with a second material poured into the second portion of the mold.

As illustrated in FIG. 5, where mold assembly 44 is shown in an inverted position with respect to the position shown in FIGS. 2-4, a second material 60, which is different from first material 56, is then put into second recesses 52. In certain embodiments, second material 60 may be poured into second recesses 52. It is to be appreciated that second material 60 can be inserted into second recesses 52 in other manners, such as injection. In certain embodiments, second material is also a polyurethane (PU) foam.

Figure 6:
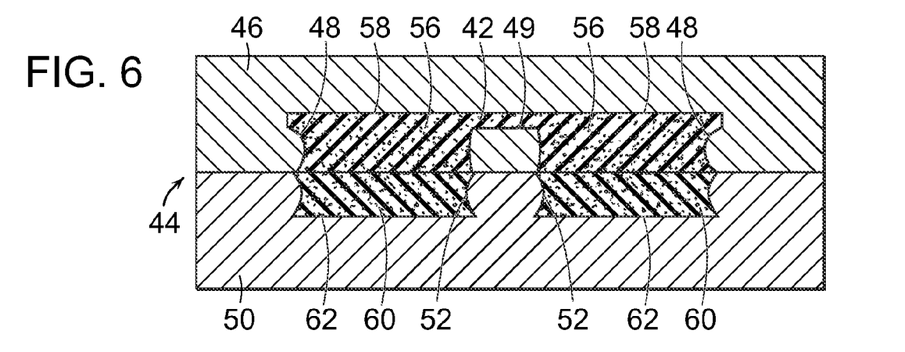
FIG. 6 is a section view of the mold of FIG. 5, shown in a closed condition with the first material in the first portion of the mold and the second material in the second portion of the mold.

Mold assembly 44 is then closed again, as seen in FIG. 6, so that first portion 46 of mold assembly 44 is in contact with second portion 50 of mold assembly 44, and first portions 58 of support members 38 are in contact with second material 60.

Mold assembly 44 with first portions 58 and second material 60 contained therein is then heated for a specified period of time. In certain embodiments, mold assembly 44 at this point is heated at a temperature of between about 60° C. and about 70° C. for between about 5 minutes and about 8 minutes. During this second heating step, second material 60 is bonded to first material 56 of first portions 58, with second material 60 forming second portions 62 of support members 38. Once the second heating step is complete, mold assembly 44 is opened, first portions 58, web 42, and second portions 62 are removed from mold assembly 44, producing support assembly 36, seen in FIG. 7, having a plurality of support members 38 with web 42 extending between support members 38.

Although, as noted above, first material 56 and second material 60 may both be formed of PU, they have different properties such that first material 56 has a lower resiliency than that of second material 60. Providing first and second materials 56, 60 with different resiliency, stiffness, and other parameters, allows individual support members 38 of support assembly 36 to be customized or optimized to provide particular performance characteristics. Certain support members 38 can be formed of a larger percentage of first material 56 than second material 60, such that that particular support member 38 is less resilient and stiffer than other support members. Additionally, other support members 38 can be formed can be formed of a larger percentage of second material 60 than first material 56, such that that particular support member 38 is more resilient and less stiff than other support members.

For example, in certain embodiments, first material 56 has a resiliency of between about 10 and about 20, and in certain embodiments between about 14 and about 15, while second material 60 has a resiliency of at least about 60, and in certain embodiments between about 64 and about 65.

In certain embodiments, first material 56 has a hardness that is greater than that of second material 60. In certain embodiments the hardness of first material 56 is between approximately 71 and approximately 72 Asker C, while the hardness of second material 60 is between approximately 72 and approximately 76 Asker C.

In certain embodiments the specific gravity of each of first material 56 and second material 60 is between about 0.68 and about 0.72.

In the embodiment illustrated in FIGS. 1-6, and 8, an interface 64 between first portion 58 and second portion 62 of each support member 38 is substantially planar, and extends substantially horizontally and substantially perpendicular to longitudinal axis L of support member 38. It is to be appreciated that interface 64 need not extend in this direction, and that other orientations and configurations of interface 64 are considered to be suitable.

Figure 9:
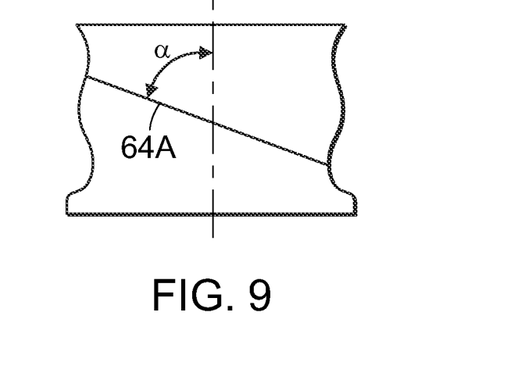
FIG. 9 is an elevation view of an alternative embodiment of a column of the support assembly of the article of footwear of FIG. 1.

For example, as seen in FIG. 9, interface 64A is substantially planar and extends at an angle a with respect to longitudinal axis L. In certain embodiments, interface 64A is angled upwardly toward a lateral side of support assembly 36, providing lateral support for the user's foot. However, it is to be appreciated than angled interface 64A can be oriented in any desired direction.

It is to be appreciated that each of the support members 38 in support assembly 36 may have the same orientation of interface 64, while in certain embodiments, one or more interfaces 64 may be different than those of other support members 38. For example, as seen in FIG. 7, angled interface 64A on the rearmost support member 38 on lateral side 24 of support assembly 36 is angled upwardly toward both lateral side 24 and heel 20 of support assembly 36, while the other interfaces 64 extend substantially horizontally. Such an angled interface for the lateral and rearmost support member 38 provides support for a user's heel in a lateral and rearward facing direction. It is to be appreciated that interfaces 64 for support members 38 can have any desired configuration.

Figure 10:
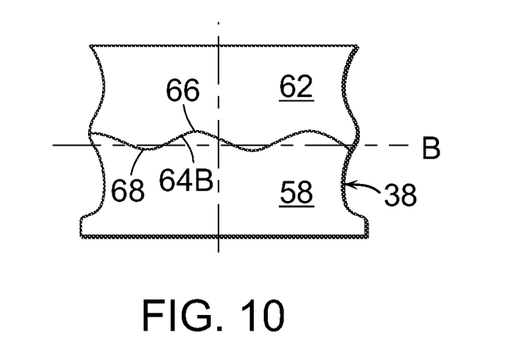
FIG. 10 is an elevation view of another alternative embodiment of a column of the support assembly of the article of footwear of FIG. 1.
Figure 11:
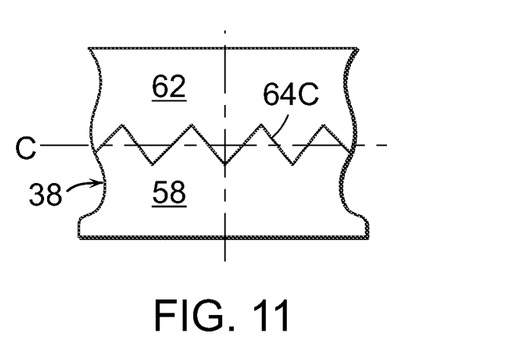
FIG. 11 is an elevation view of yet another alternative embodiment of a column of the support assembly of the article of footwear of FIG. 1.

In the embodiment illustrated in FIG. 10, interface 64B is non-planar and forms a wave-shaped profile having crests 66 and troughs 68 extending along an axis B. As illustrated here, axis B of interface 64B extends substantially horizontally and substantially perpendicular to longitudinal axis L of support member 38. However, axis B of interface 64B may extend at an angle with respect to longitudinal axis L.

In the embodiment illustrated in FIG. 10, interface 64C is non-planar and has a saw-tooth profile extending along an axis C, and has alternately upwardly and downwardly extending sloped surfaces. As illustrated here, axis C of interface 64C extends substantially horizontally and substantially perpendicular to longitudinal axis L of support member 38. However, axis C of interface 64C may extend at an angle with respect to longitudinal axis L.

It is to be appreciated that the interfaces 64 of support members 38 may have any desired profile or configuration, and that some or all of support members 38 may be the same, or different from one another.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a support assembly for an article of footwear comprising placing a first material into a first portion of a mold;

placing each of a plurality of inserts in a second portion of the mold;

heating the mold a first time for a first predetermined period of time at a first predetermined temperature such that the first material forms a plurality of first portions and a web of a support member of a support assembly, the web connecting all of the first portions to one another;

removing the inserts from the mold and placing a second material in the second portion of the mold, the second material having a higher resiliency than the first material;

heating the mold a second time for a second predetermined period of time at a second predetermined temperature such that the second material bonds to the first material and forms a second portion of the support member; and removing the support member from the mold.

2. The method of claim 1, wherein the first period of time is between about 5 minutes and about 8 minutes, and the first temperature is between about 60° C. and about 70° C.

3. The method of claim 1, wherein the second period of time is between about 5 minutes and about 8 minutes and the first temperature is between about 60° C. and about 70° C.

4. The method of claim 1, wherein the first and second materials are polyurethane.

5. The method of claim 1, wherein the first portion includes a plurality of first recesses and a web recess interconnecting the first recesses.

6. The method of claim 5, wherein the second portion includes a plurality of second recesses, each second recess cooperating with a corresponding first recess to define a substantially cylindrical recess.

7. The method of claim 6, wherein the support assembly includes four support members.

8. The method of claim 1, wherein the first and second material are poured into the first and second portions, respectively.

9. The method of claim 1, wherein an interface between the first and second portions of the support member is a plane that extends substantially perpendicular to a longitudinal axis of the support member.

10. The method of claim 1, wherein an interface between the first and second portions of the support member is a plane that extends at an angle with respect to a longitudinal axis of the support member 7.

11. The method of claim 1, wherein an interface between the first and second portions of the support member is non-planar.

12. The method of claim 1, wherein the support member includes an interior void.

13. The method of claim 1, further comprising the step of applying a release agent to the second recess before placing the insert in the second recess.

14. The method of claim 1, further comprising the step of applying a release agent to the insert before heating the mold the first time.

15. A method of manufacturing a support assembly for an article of footwear comprising pouring a quantity of polyurethane having a first resiliency into a plurality of first recesses and into a web recess that interconnects the first recesses in a first portion of a mold;

placing each of a plurality of inserts in corresponding second recesses formed in a second portion of the mold;

heating the mold a first time for a first predetermined period of time at a first predetermined temperature such that the first material in the first recesses forms a first portion and a web of a support member of a support assembly;

inverting the mold such that the first portion of the mold is above the second portion of the mold;

removing the inserts from the second recesses and pouring a quantity of polyurethane having a second resiliency that is less than the first resiliency into the second recesses;

heating the mold a second time for a second predetermined period of time at a second predetermined temperature such that the second material bonds together to the first material and forms a second portion of a support member of a support assembly, the support members being connected to one another by the web; and removing the support assembly from the mold.

* * * * *

UNITED STATES PATENT AND TRADEMARK OFFICE
CERTIFICATE OF CORRECTION

| | | |
|---|---|---|
| PATENT NO. | : 9,044,882 B2 | Page 1 of 1 |
| APPLICATION NO. | : 13/118982 | |
| DATED | : June 2, 2015 | |
| INVENTOR(S) | : Kyoungmin Song | |

It is certified that error appears in the above-identified patent and that said Letters Patent is hereby corrected as shown below:

On The Title Page,

In the Title item (54), please change:

"ARTICLE OF FOOTWEAR WITH SUPPORT COLUMNS HAVING PORTIONS WITH DIFFERENT RESILIENCIES AND METHOD OF MAKING SAME"

to

--ARTICLE OF FOOTWEAR WITH SUPPORT MEMBERS HAVING PORTIONS WITH DIFFERENT RESILIENCIES AND METHOD OF MAKING SAME--

Signed and Sealed this
Fifteenth Day of December, 2015

Michelle K. Lee
*Director of the United States Patent and Trademark Office*